2,999,847
UREA AND THIOUREA RESINOUS COMPOSITION
Joseph John Nemes, Somerville, and Richard Dickran Vartanian, Bound Brook, N.J., assignors to American Cyanamid Company, New York, N.Y., a corporation of Maine
No Drawing. Filed Feb. 16, 1959, Ser. No. 793,275
7 Claims. (Cl. 260—69)

This invention relates to water-soluble, thermosetting, partially polymerized, stable resinous compositions, the compositions themselves, and their use in the impartation of durable, stiff, flame-resistant finishes to textile materials. More particularly, the present invention relates to such resinous compositions containing urea and thiourea components, to their process of preparation and their use, particularly on nylon-containing textile materials.

Thiourea-formaldehyde resins and urea-formaldehyde resins, and particularly their methylolated derivatives, are in general well known in the art. Urea-formaldehyde condensates and thiourea-formaldehyde condensates have commonly been considered to be equivalent. While this suggested equivalence may be true insofar as some varieties of resins is concerned, it has been our experience that their methods of preparation are not fully equivalent with respect to the production of water-soluble resins. For example, when a mole of thiourea is refluxed with formaldehyde in quantities of the order of 1.33 and 2.3 moles, it has been found that the reaction mixture hydrophobes upon dilution with water after relatively short periods of time. Yet under the same conditions, urea-formaldehyde mixtures can be refluxed considerably longer and still yield partial condensates of a water-soluble or water-dilutable nature. Moreover, even when water-soluble thiourea-formaldehyde resins are obtained, they have a serious drawback in their lack of stability, especially in concentrated solutions, which is manifested by a tendency to precipitate as crystals or to hydrophobe upon dilution with water.

In order to achieve the necessary stability and water-solubility of these resins, namely, urea-formaldehyde and thiourea-formaldehyde, and in particular mixtures of the same, carefully controlled intricate processes have been developed where, for the first time, suitable stable, water-soluble, resinous mixtures have been prepared for use, particularly in the textile finishing industry. One such method of obtaining stable, water-soluble mixtures of these resins has been to modify compositions of the same with sodium bisulfite so as to improve their stability and water-solubility. While the addition of sodium bisulfite has been found to impart satisfactory stability, these compositions which are useful to impart stiffness and flame-resistance to textile materials and in particular to nylon netting, have in general suffered the deficiency that when applied and cured, dusting or flaking of the finish from the treated material is often encountered. Obviously, these drawbacks have to some extent limited the success of these resins. Additionally, sodium bisulfite modified resins are difficult to cure and conditions which will effect a suitable cure in conventional periods of time often result in discoloration of the finished material, and in particular, nylon material, rendering such materials, particularly when they are white goods, unacceptable.

Other urea and thiourea resinous compositions prepared by intricate and specific processes, while constituting noteworthy advances in this field of endeavor, have been themselves subject to limitations, in that in order to prepare the same, relatively large excesses of free formaldehyde are necessarily employed which render such resins highly undesirable to work with, both at the manufacturing and finishing levels. Still further, many of these resinous compositions do not impart a durable, stiff finish of themselves and must be modified, as for example, by blending with other thermosetting aminoplast resins in order to achieve the desired degree of stiffness. Moreover, many of these compositions, while producing highly satisfactory flame-retardancy, allow room for substantial improvement.

Accordingly, it is an object of the present invention to provide a water-soluble, stable, partially polymerized, potentially thermosetting, resinous composition containing urea and thiourea resinous components, when properly cured on textile fabric and in particular nylon textile material, imparts a durable stiff hand thereto, as well as flame-resistance.

It is a further object of the present invention to provide a process for preparing such a resinous composition.

It is a further object of the present invention to provide such a resinous composition, which when applied and properly cured, does not produce significant undesirable discoloration of the finished textile material, does not flake or dust when subjected to handling or mechanical action.

It is a still further object of the present invention to provide such a resinous composition containing a minimum of free formaldehyde, which is prepared by a so called "one-pot" process, which resinous composition need not be blended with other resinous materials to achieve any of the desirable properties identified hereinabove.

These and other objects and advantages of the present invention will become more apparent from the detailed description of this invention as it is set forth hereinbelow.

According to the present invention a stable, hydrophilic, partially polymerized, potentially thermosetting, resinous product, comprising a partially alkylated methylol urea, a partially methylolated thiourea and free thiourea is prepared by reacting in an aqueous medium relative proportions of one mole of urea and 1.50 to 2.35 moles of formaldehyde at a pH between 7 and 10 and at a temperature of between about 70 and about 100° C. for from between 0.25 and 2.0 hours. Preferably, the formaldehyde-urea condensation is carried out in the presence of from between 0.3 and 2.0 moles of a monohydric aliphatic alcohol containing 1 to 3 carbon atoms, and after this condenation has been effected, the pH of the reaction mixture is adjusted from between 4 and 6 with a suitable acid. If the alcohol was not present in the reaction mixture initially, it is then added in an amount of from between 0.3 and 2.0 moles per mole of urea. The alkylation is then carried out at a temperature of from between 70 and 100° C. for from 0.25 to 2.0 hours. The pH of the mixture is then adjusted to 7.0 to 9.0 and from between 0.18 and 0.75 mole of thiourea is added. Additional formaldehyde may be introduced if necessary to give from between 0.03 to 0.35 mole of available formaldehyde, however, the formaldehyde added or the conditions of methylolation of the thiourea should be sufficient to insure free thiourea in the final reaction product. The reaction mixture is then heated from 50 to 100° C. for from 1 to 30 minutes and thereafter cooled, as for example, to room temperature. Sometimes it is desirable to adjust the viscosity as determined by a Stormer viscosimeter to from between about 200 to about 1000 centipoises by the addition of water thereto.

In the preferred procedure proportions of one mole of urea and 1.9 to 2.5 moles of formaldehyde are reacted at a temperature of from between 90 and 100° C. and at a pH of from between 7.5 and 8.5 for from between 0.25 to 0.75 hour. The alkylation step is then carried out with methanol at a pH of from between 4.2 to 4.8 and at a temperature of from between 90 and 100° C. for from 0.5 to 1.0 hour. The pH is then adjusted to between 7.4 and 7.8 and from between 0.25 and 0.57 mole of thiourea and from between 0.0 to 0.25 mole of formaldehyde are added so that excess thiourea over available formaldehyde is maintained in the range of between 0.20 and 0.32 mole. The reaction of the thiourea with the formaldehyde is carried out at 75° C. to 85° C. for from between 5 and 15 minutes. After cooling to from between 40° C. and to room temperature the viscosity may then be adjusted from between 500 and 700 centipoises by the addition of water where this is necessary.

The aldehyde employed in preparing the resinous composition of the present invention may be selected from a wide variety of water-soluble aliphatic aldehydes capable of producing water-soluble components when employed under the reaction conditions of the present invention. These include, formaldehyde, acetaldehyde, propionaldehyde, glyoxal, and the like. For purposes of the present process, formaldehyde, either as formalin solution or in its more concentrated form, such as paraformaldehyde is preferred. Paraformaldehyde, as a concentrated form of formaldehyde, has the advantage in that it eliminates the requirement for the removal of substantial amounts of excess water when the final product is to be concentrated, and it is specifically desirable in the preparation of the alkylated urea-formaldehyde component, in that the presence of large amounts of water appear to impede alkylation.

The alcohol employed in alkylating the urea-formaldehyde component is an aliphatic monohydric alcohol containing from 1 to 3 carbon atoms. Thus, for example, methyl, ethyl, propyl, and isopropyl alcohol or mixtures thereof are the alcohols contemplated in the present invention. Of these, methyl alcohol or methanol is greatly preferred, in that the solubility and stability characteristics of the final resinous product are more easily regulated and enhanced.

The products of this invention have three essential components. These are a partially alkylated and preferably partially methylated dimethylol urea, a partially methylolated thiourea, and free thiourea. The resinous composition contains from between 65 and 90% and preferably from between 70 and 85% of partially alkylated dimethylol urea between 20 and 2% and preferably from between 16 and 4% of the partially methylolated thiourea, and from between 15 and 8% and preferably 14 and 11% of free thiourea.

With respect to molar concentrations in the final resinous composition, it contains, based on 1 mole of the partially alkylated dimethylol urea, from between 0.03 to 0.35 mole, and preferably from between 0.05 and 0.25 mole, of monomethylol thiourea, and from between 0.15 and 0.40 mole, and preferably from between 0.20 and 0.32 mole, of thiourea.

The resinous composition contains components derived from between 55 and 80 parts, preferably 60 to 75 parts, of urea and from 45 to 20 parts, preferably 40 to 25 parts, of thiourea, based on the total usage of urea plus thiourea of 100 parts.

Those compositions containing higher amounts of the monomethylol thiourea and consequently total thiourea are preferred over those of lower thiourea content because they impart significantly improved fire-retardancy. This will be developed more clearly hereinafter in the accompanying examples.

The resinous compositions of this invention may be described as partially polymerized and is believed to be composed of some monomeric material and low order polymeric material, as for example, dimers, trimers, tetramers, pentamers, and the like. The degree of polymerization imparted by the process in accordance with this invention, while producing the low order polymers, results in a product which is soluble, stable and clear, and one which does not hydrophobe when diluted with three parts of water at 20° C. after three months of storage at a temperature of 25° C. and below.

It is the principal end use of the resin of the present invention that the resinous composition so prepared when properly applied and cured on textile materials, and in particular to nylon-containing materials, imparts, a durable, stiff finish thereto, which is flame-resistant and does not increase the combustibilty of the nylon material. Further, said resinous finish is readily cured and material so finished is free from dusting and flaking.

Nylon netting, such as nylon Rachelle net, may be treated with the resinous composition of the present invention by applying it thereto as by pad baths, spraying, immersion or other suitable application techniques in amounts of from between 1 and 70% resin solids, based on the dry weight of the fabric and preferably from between about 30 and 65% solids, based on the weight of the fabric. Thereafter, the resin finish is cured on the material, as for example, for from 5 minutes at 250° F. to 5 seconds at 450° F. and preferably from 90 seconds at 290° F. to 60 seconds at 350° F. to a water-insoluble state in the presence of an acid acting catalyst, such as ammonium bromide, ammonium chloride, certain mixed isopropanols amine hydrochlorides and the like, to impart a finish having the qualities described above. Suitable catalysts of the type referred to above are well known to those skilled in the art and may be employed in amounts of from between 0.50 and 1.5 to 10%, based on the weight of the resin solids and preferably in amounts of from between 0.50 and 1%.

In order to illustrate the present invention, the following examples are given. No details or enumerations contained therein should be construed as limitations on the present invention except insofar as they appear in the append claims. All parts and percentages are by weight unless otherwise specifically designated.

EXAMPLE 1

Into a suitable reaction vessel were charged 200 parts (6.25 moles) of methanol, 267 parts (3.3 moles) of 37% formaldehyde, about 4 parts of 40% solution of triethanolamine (pH of charge 7.5–7.9) and 450 parts (7.5 moles) of urea. The temperature of the reaction mixture was raised to 45° C. over a 20-minute period and 405 g. (12.3 moles) of 91% paraformaldehyde are added. The reaction mixture was then heated at the reflux temperature (94° C.) for about 30 minutes. After adding 30 parts of a 5% oxalic acid solution (pH 4.35), the refluxing was continued for 45 minutes. About 4 parts of a 20% sodium hydroxide solution were added (pH 7.6) followed by 190 parts (2.5 moles) of thiourea. The temperature was then held at 80° C. for 10 minutes, and after cooling to 40° C., the reaction mixture was filtered. The product had a pH of 7.6 and a viscosity of 620 cps.

The product of this example had the following calculated composition:

|  | Percent | 1-mole basis |
|---|---|---|
| Urea | 29.0 | 1.00 |
| Methanol | 12.7 | 0.83 |
| Formaldehyde | 30.7 | 2.08 |
| Thiourea | 12.2 | 0.33 |

The resinous composition prepared in accordance with the above example was characterized by the following stability: when diluted with 3 parts of water, the product was stable at 25° C. for more than 2 months, and at 12° C. for more than 6 months.

EXAMPLE 2

The same general procedure as was employed in Example 1 was employed here, except that paraformaldehyde was added prior to the urea to the reaction vessel. The final product, when adjusted to a total solids content of 71.1% at a pH of 7.6 had a viscosity of 605 cps. as determined by a Stormer viscosimeter.

This product was characterized by the same stability as the product of Example 1.

EXAMPLES 3-11

The same general procedure as was employed in Example 1 was employed in Examples 3-11, with variations in the amount of the triethanolamine employed as an alkaline catalyst and the amount of oxalic acid employed as an acid catalyst. Additionally, the pH at which methylation was carried out and the reflux time during methylation was varied. These variations are illustrated in Table I hereinbelow.

TABLE I

| Example No. | 3 | 4 | 5 | 6 | 7 | 8 | 9 | 10 | 11 |
|---|---|---|---|---|---|---|---|---|---|
| 50% triethanolamine [1] | 1.6 | 1.4 | 1.5 | 1.6 | 1.6 | 1.4 | 1.6 | 1.4 | 1.6 |
| pH [1] | 7.95 | 7.9 | 7.95 | 7.95 | 7.95 | 7.9 | 7.95 | 7.9 | 7.95 |
| 5% Oxalic Acid [2] | 14.5 | 14.5 | 14.5 | 12.0 | 13.0 | 12.0 | 13.0 | 12.0 | 14.5 |
| pH [2] | 4.1 | 3.5 | 3.75 | 4.65 | 4.25 | 4.15 | 4.4 | 4.2 | 4.0 |
| Reflux, min. [2] | 45 | ([3]) | ([3]) | 45 | 45 | 45 | 45 | 45 | 17 |
| Viscosity, final | 4,000 | | | 275 | 375 | 850 | 455 | 810 | 325 |

[1] Urea-formaldehyde condensation step. Batch size one-half of Example 1.
[2] Methylation step.
[3] Batch eelled during reflux due to polymerization at this pH.

Examples 3, 4 and 5 indicate that the pH during the alkylation step is largely the determining factor for final viscosity. The effect of a deficiency in the alkaline catalyst can be corrected by decreasing the amount of oxalic acid used, so that the recommended pH for the alkylation step is not below 4.2. (Compare Examples 6, 7 and 9 with 3 and 10 with 5.) Also, by shortening the reflux time during the alkylation step, it is possible to produce a product with a lower viscosity. (Compare Examples 3 and 11.)

EXAMPLE 12

*Employing additional amounts of thiourea*

A reaction vessel was charged with 300 parts (9.4 moles) of methanol, 400 parts (4.93 moles) of 37% formaldehyde solution, 4.8 parts of 40% solution of triethanolamine (pH 7.65) and 607.5 parts (18.4 moles) of 91% paraformaldehyde. The reaction mixture was heated to 45° C. and 675 parts (11.25 moles) of urea were added. After heating to the reflux over 25 minutes and refluxing for 30 minutes, 39 parts of oxalic acid were added (pH 4.1) and the refluxing was continued for 45 minutes. About 5 parts of 20% sodium hydroxide solution were then added, and the reaction mixture was divided into two equal parts.

Part 1: 178 parts (2.34 moles) of thiourea were added and the reaction mixture was held at 80° C. for 10 minutes. When cooled to 40° C., the pH was 7.7, the viscosity was 480 cps., the total solids were 73.5%. After dilution with water to a total solids content of 70%, the viscosity was 233 cps. The stability of the product is the same as in Example 1.

Part 2: After adding 178 parts (2.34 moles) of thiourea and 40 parts (0.49 mole) of 37% formaldehyde solution, the reaction mixture was heated at 80° C. for 10 minutes. When cooled to 40° C., the pH was 7.5, the viscosity was 390 cps. and the total solids were 72.7%. After diluting to 70% total solids, the viscosity was 240 cps. The stability of the product was the same as that for the product of Example 1.

EXAMPLE 13

*Additional amounts of thiourea*

A reaction mixture consisting of 150 parts (4.74 moles) of methanol, 200 parts (2.47 moles) of 37% formaldehyde, about 2.4 parts of 40% solution of triethanolamine and 304 parts (9.2 moles) of 91% paraformaldehyde was heated to 45° C., and 338 parts (5.63 moles) of urea were added. The reaction mixture was heated to the reflux point and refluxed for 30 minutes. After adding 19.7 parts of 5% solution of oxalic acid, the refluxing was continued for 50 minutes. The pH was then adjusted to about 7.6 with 2.7 parts of 20% sodium hydroxide solution. When 43 parts (0.53 mole) of 37% formaldehyde and 190 parts (2.5 moles) of thiourea had been added, the reaction mixture was heated at 80° C. for 10 minutes and then cooled to 40° C.

Table II hereinbelow summarizes the constituents of the resinous composition of the present invention, as defined on a monomeric basis, for Examples 1-13 hereinabove.

TABLE II

|  | Examples 1-13 | |
|---|---|---|
|  | Percent basis | Molar basis |
| Methylated dimethylol urea | 76.5-82.2 | 1.00 |
| Monomethylol thiourea | 5.4-11.0 | 0.08-0.17 |
| Thiourea | 12.4-12.5 | 0.25-0.27 |
| Combined methanol | | 0.42 |

EXAMPLES 14 AND 15

The same general procedure as was carried out in Example 13 was carried out here, with the exception that variations in the alkylation reflux time were effected. The details and results of these variations are shown in Table III hereinbelow.

TABLE III

| Example | 13 | 14 | 15 |
|---|---|---|---|
| Alkylation pH | 4.4 | 4.3 | 4.5 |
| Alkylation time, min | 50 | 55 | 60 |
| Viscosity, cps | 550 | 730 | 1,000 |

EXAMPLES 16-18

Examples 16-18 are similar to Example 13, the relative amounts of reactants being unchanged. The difference between these examples is set forth in Table IV.

To a suitable reaction vessel there were charged 60 parts of methanol, 80 parts of 37% formaldehyde, 0.96 part of 40% triethanolamine and 12.0 parts of 91% paraformaldehyde. The charge was heated to 45° C., and 135 parts of urea were added. After refluxing for 30 minutes, 7.87 parts by volume of 5% solution of oxalic acid were added and the charge was refluxed for 42-45 minutes. The pH was then adjusted to between 7.4 and 7.8 with about 0.53 part of 30% sodium hydroxide solution. After charging 17 parts of 37% formaldehyde and 76 parts of thiourea, the reaction mixture was heated at 80° C. for 10 minutes. The charge was then cooled to 40° C. and, where necessary, the viscosity was adjusted to the desired value by adding water.

TABLE IV

| Example No. | 16 | 17 | 18 |
|---|---|---|---|
| pH after triethanolamine | 8.0 | 8.1 | 8.1 |
| pH after oxalic acid | 4.3 | 4.3 | 4.3 |
| Alkylation reflux, min | 45 | 42 | 42 |
| Viscosity of product, cps | 1,450 | 590 | 860 |
| Water added, parts | 19 | 0 | 3 |
| Final viscosity, cps | 700 | 590 | 720 |
| pH | 8.0 | 7.3 | 8.3 |
| Total solids, percent | 68.9 | 73.7 | 71.4 |
| Hydrophobe [1] (appearance of haze upon dilution) | 1:5 | 1:10 | 1:10 |

[1] Parts of resin:parts of water by weight.

EXAMPLE XIX

Pad baths containing 80% of the products of Examples 1–2 and 12–18 (about 56% resin solids), 0.64% of ammonium chloride and 19.36% water were applied by padding to nylon marquisette. A pickup of about 100% indicated an application of about 56% on the weight of the fiber. The treated fabrics were then dried and cured for one minute at 310° F.

TABLE V

| Products of Examples | 1–2 | 12–18 |
|---|---|---|
| Fire retardancy | Good | Better than Examples 1–2. |
| Dusting | None | None. |
| Hand | Satisfactory | Satisfactory. |
| Permanence to repeated crushing. | do | Do. |

The alkaline catalyst employed to adjust the pH of the alkaline side during methylolation of the urea and the thiourea components in accordance with the present process may be any suitable alkaline material which does not react with the reactants or the reaction product in accordance with the present invention. Suitable examples of such catalysts include sodium hydroxide, potassium hydroxide, sodium carbonate, sodium bicarbonate, triethanolamine, triethylamine, morpholine, and the like. In accordance with the present invention, it is greatly preferred to employ triethanolamine, in that as an alkaline catalyst, it tends to buffer out at the desired pH levels and thus does not require added catalysts during methylolation.

The acid catalyst employed during the alkylation and preferably methylation of the urea-formaldehyde condensate in accordance with the present invention may be any suitable acidic material which does not react with the reactants or the reaction products in accordance with the present invention. Preferably, the acids are organic acids and include such acids as oxalic, tartaric, acetic, succinic, and the like, although inorganic acids, as for example, sulfuric, hydrochloride, and the like, may be employed if desired.

As has been pointed out, products of the present invention are particularly useful and applicable in the field of textile finishing, and more specifically in the field of finishing nylon fabric, where frequently it is desirable that the fabric have a stiff, flame-resistant finish, as in the case of evening dresses and petticoats. However, the resinous compositions of the present invention may be employed for other purposes, as for example, in the paper industry as a chemical intermediate and the like.

While the use of the resinous composition of this invention has been described primarily in conjunction with the finishing of formed nylon fabrics, it should be understood that fibers, yarns, or fabrics of nylon alone or in blends with synthetic or natural fibers are contemplated. Such blends should contain at least 50% nylon in combination with such materials as cotton, linen, wool, regenerated cellulose, such as viscose, rayon and cuprammonium rayon, cellulose acetate, acrylic fibers, polyester fibers, and the like.

We claim:

1. A process for preparing a stable, hydrophilic, partially polymerized, potentially thermosetting, resinous product, comprising a partially alkylated dimethylol urea and a partially methylolated thiourea and free thiourea, which comprises methylolating by reacting in an aqueous medium relative proportions of one mole of urea with from between 1.50 and 2.35 moles of formaldehyde at a pH of between 7 and 10, and at a temperature of between about 70 and about 100° C. for from 0.25 to 2.0 hours, adjusting the pH of the reaction mixture to from between 4 and 6, alkylating the urea-formaldehyde condensate by reacting it with from between about 0.3 and 2.0 moles of a saturated aliphatic monohydric alcohol containing from 1 to 3 carbon atoms at a temperature of from between 70 and 100° C. for from between 0.25 and 2.0 hours, adjusting the pH of the reaction mixture to a value from between 7.0 and 9.0 and adding thereto from between 0.18 and 0.75 mole of thiourea, reacting said thiourea with from between 0.03 to 0.35 mole of available formaldehyde at a temperature of from between 50 and 100° C. for from 1 to 30 minutes to produce a stable resinous product, said stable resinous product being one which does not become turbid when maintained for four weeks at 25° C. and which does not hydrophobe when diluted with three times its volume of water at 20° C.

2. A process according to claim 1, in which methylolation of the urea component is carried out in the presence of from between 0.3 and 2.0 moles of methanol.

3. A process for preparing a stable, hydrophilic, partially polymerized, potentially thermosetting resinous product, comprising a partially alkylated dimethylol urea, a partially methylolated thiourea and free thiourea, which comprises methylolating by reacting in an aqueous medium one mole of urea and 1.9 to 2.25 moles of formaldehyde at a temperature between 90 and 100° C. and at a pH of between 7.5 to 8.5 for from between 0.5 and 0.75 hour, adjusting the pH of the reaction mixture to a value of from between 4.2 and 4.8, and alkylating by reacting said urea-formaldehyde condensate with from between 0.3 to 2.0 moles of a saturated aliphatic monohydric alcohol containing 1 to 3 carbon atoms at a temperature of from between 90 and 100° C. for from between 0.5 and 1.0 hour, thereafter adjusting the pH of the reaction mixture to from between 7.4 and 7.8 and adding thereto from between 0.25 and 0.57 mole of thiourea, adding from between 0 to 0.25 mole of formaldehyde so that excess thiourea is present in the reaction mixture in an amount of from between 0.20 to 0.32 mole, reacting a portion of the thiourea with formaldehyde at a temperature of from between 75 to 85° C. for from 5 to 15 minutes, so as to produce a stable resinous product, said stable resinous product being one which does not become turbid when maintained for four weeks at 25° C. and which does not hydrophobe when diluted with three times its volume of water at 20° C.

4. A process according to claim 3, in which the alcohol is methanol.

5. A product prepared in accordance with the process of claim 1.

6. A product prepared in accordance with the process of claim 3.

7. A process for treating nylon containing textile fabric, comprising treating said fabric with a composition comprising from between about 5 and about 50% resin solids produced according to claim 5 and thereafter curing said finish on the fabric to a water-soluble state in the presence of a catalyst to produce a durably stiff flame-resistant finish.

References Cited in the file of this patent

UNITED STATES PATENTS

| 1,890,033 | Gams et al. | Dec. 6, 1932 |
| 2,121,077 | Ellis | June 21, 1938 |
| 2,750,356 | Hurwitz | June 12, 1956 |
| 2,859,206 | Polansky | Nov. 4, 1958 |